United States Patent [19]

Laffey et al.

[11] Patent Number: 5,605,490

[45] Date of Patent: Feb. 25, 1997

[54] METHOD OF POLISHING LANGASITE

[75] Inventors: Sally M. Laffey, Eatontown; John R. Vig, Colts Neck; Mary A. Hendrickson, Forked River, all of N.J.

[73] Assignee: The United States of America as represented by the Secretary of the Army, Washington, D.C.

[21] Appl. No.: 311,794

[22] Filed: Sep. 26, 1994

[51] Int. Cl.⁶ .................................................. B24B 1/00
[52] U.S. Cl. ........................... 451/36; 451/41; 156/625.1
[58] Field of Search ................................. 451/41, 36, 37, 451/28; 437/225, 974; 156/625.1

[56] References Cited

U.S. PATENT DOCUMENTS 3,897,628  8/1975  Hanak et al. ........................ 29/580
5,480,476  1/1996  Cook et al. .......................... 106/3
5,494,849  2/1996  Iyer et al. ............................ 437/63

*Primary Examiner*—Robert A. Rose
*Attorney, Agent, or Firm*—Michael Zelenka; William H. Anderson

[57] ABSTRACT

A piezoelectric material langasite, having a defect free surface is obtained by polishing the surface of the material with a colloidal silica suspension diluted with water to about 10 to 30% concentration by weight and etching the surface of the polished piezoelectric material in an approximate 1:50:150 solution of $HCl:HF:H_2O$ at about 70° C.

5 Claims, No Drawings

METHOD OF POLISHING LANGASITE

GOVERNMENT INTEREST

The invention described herein may be manufactured, used, and licensed by or for the Government for governmental purposes without the payment to us of any royalties thereon.

FIELD OF INVENTION

The invention relates in general to a method of treating the surface of a piezoelectric material so as to obtain a defect free surface and to the surface so obtained and in particular to such a method wherein the piezoelectric material being treated is langasite. By a defect free surface is meant a film free, scratch free surface of less than 10 nm rms surface roughness.

BACKGROUND OF THE INVENTION

The chemistry of polishing typical piezoelectric materials such as quartz or langasite ($La_3Ga_5SiO_{14}$) is complicated. For example, when diamond and aluminum oxide are used to "polish" quartz or langasite, both produce a damaged surface, and diamond produces more seriously damaged surfaces for the same particle size.

The phase transition of quartz at 573° C. limits the processing temperatures one can use in the fabrication of quartz resonators. It also prevents the use of quartz crystals in high temperature environments as, for example, as sensors. Langasite is a promising new piezoelectric material that is similar to quartz in its acoustic behavior, but unlike quartz, it has no phase transition up to its melting point of 1470° C. This may allow higher stabilities through higher temperature processing, and may also allow sensors for high-temperature environments, such as deep oil and gas wells.

Langasite's acoustic attenuation has been reported to be three to five times lower than that of quartz. This suggests that higher device Qs should be possible, however, the Qs of langasite resonators have been reported to be significantly lower than the Qs that can be achieved with quartz resonators of the same frequency. This discrepancy has been attributed to the lack of good polishing methods for langasite.

SUMMARY OF THE INVENTION

The general object of this invention is to provide polishing and etching methods for piezoelectric materials that are capable of producing defect free piezoelectric surfaces. A more particular object of the invention is to provide such polishing and etching methods for langasite crystal surfaces.

It has now been found that the aforementioned objects can be attained by polishing the surface of the langasite crystal with a colloidal silica suspension either undiluted or diluted with water and etching the surface of the polished piezoelectric material in an approximately 1:50:150 solution of $HCl:HF:H_2O$ at about 70° C.

DESCRIPTION OF THE PREFERRED EMBODIMENT

Y-cut langasite wafers are used, each wafer having an area of approximately 1.9 $cm^2$. The wafers are lapped on an Elgin—Model 1.12 lapping machine, and the polishing is performed on an R Howard Strasbaugh Model 6BQ polishing machine, at 60 RPM, with a swing of 65 CPM. The pressure during polishing is about 90 $g/cm^2$. Three or more langasite plates are lapped and then polished together.

The polishing process attempted, and the results, are listed in Table 1.

TABLE I

| Polishing experiment results. | |
| --- | --- |
| Polishing Process | Results |
| Cerium oxide on pellon paper | Scratches, insufficient polishing |
| 1 m aluminum oxide on pellon paper | Scratches, insufficient polishing |
| 1 m aluminum oxide on polyurethane impregnated polyester felt (Suba ™ 500[5]) | Scratches, insufficient polishing |
| Colloidal silica (Syton ™ HT-50 [6]) on wool felt (Buehler AB Miramet [7]) | Good polish |
| Colloidal silica (Syton HT 50) on polyurethane impregnated polyester felt | Excellent polish |
| Colloidal silica (Nalco 2360 [8]) on polyurethane impregnated polyester felt | Excellent results, with no edge rounding visible |
| Colloidal silica (Nalco 2360) on Politex Supreme pad [5] | Best results, with no edge rounding visible |

These initial experiments are aimed primarily at developing a method that works, rather than minimizing the polishing times. Cerium oxide, which is widely used for polishing quartz, fails to polish langasite as does 1 μm aluminum oxide. The best results, by far, are obtained with colloidal silica and fumed silica slurries. Successful polishing is obtained when the polishing slurry contains colloidal silica particles of average particle size 30 nm to 50 nm, the pH of the slurry is 10.6 to 11, and the concentration of silica particles, by weight, is about 12%. The polishing pad can be a polyurethane impregnated polyester felt, such as Suba™ 500, sold by Rodel, Scottsdale Ariz.; or a polyurethane coated suede, such as Ultra Pol 1 or MP-101, sold by Rippey Corp., El Dorado Hills, Calif.; or a polyurethane poromeric on a compressible but elastic substrate, such as Politex Supreme™, sold by Rodel, Scottsdale Ariz.

Colloidal silica polishing slurries include discreet submicron amorphous silica particles dispersed in water, and, usually, some additives as for example potassium hydroxide, for controlling pH. The particles are nearly spherical in shape. The particle sizes are very small, and on the average of 50 nm. The rates of polishing langasite plates with colloidal or fumed silica depend on several factors. Among the main variables are: particle size in the slurry, particle concentration, and pH; the pad's mechanical properties and porosity; the relative velocity of the langasite plate and the pad, the pressure the langasite plate applies to the pad; and the roughness of the langasite plate.

In the polishing slurry, the typical particle size is 30 nm to 70 nm, the typical concentration is 5% to 50% by weight, and the pH is about 9.5 to 11. The pad is made of a microporous material such as polyurethane. The pad surface performs two important functions: slurry transport, and the removal of reaction products from the pad-wafer interfaces. The polishing rate decreases with cumulative polishing time, probably because the pores in the pad get clogged. The pad must, therefore, be regenerated periodically in order to maintain near-maximum polishing rates. Regeneration consists of abrading the pad surface, e.g., with a diamond impregnated wheel or a stiff brush, in order to remove a surface layer from the pad.

The etchant selected for use is a 1:50:150 solution of $HCl:HF:H_2O$ as this solution provides a reasonable etching rate, while being able to chemically polish langasite.

Colloidal and fumed silica has been shown to be able to polish both langasite and quartz without producing a sub-surface damaged layer. Etching the polished surfaces with chemical polishing etchants produce no degradation of the polished surfaces. For example, no degradation of the polished surfaces results when colloidal silica polished AT-cut quartz crystals are deeply etched in a saturated solution of ammonium bifluoride, when colloidal silica polished SC-cut quartz crystals are deeply etched in a 4:1 solution of ammonium fluoride and hydrofluoric acid, and when Y-cut langasite is deeply etched in a 1:50:150 solution of $Hcl:HF:H_2O$.

That etching does not degrade the polished surfaces suggests that polishing resonator plates with colloidal silica followed by deep etching can allow the micromachining of quartz and langasite structures, including the production of very thin and very small resonator plates, provided that the plates are made of sufficiently defect free materials.

In lieu of quartz or langasite as the piezoelectric material, one may use lithium tetraborate, lithium tantalate, lithium niobate, gallium phosphate or berlinite.

We wish it to be understood that we do not desire to be limited to the exact details of construction shown and described for obvious modifications will occur to a person skilled in the art.

What is claimed is:

1. A method of treating langasite to provide the langasite with a film free, scratch free surface having a surface roughness of less than 10 nm rms, said method comprising the steps of:

polishing the surface of the langasite with a colloidal and fumed silica suspension; and wet etching the polished surface of the langasite so the polished surface remains polished after etching.

2. The method according to claim 1 wherein the colloidal silica suspension is a colloidal dispersion of amorphous and spherical $SiO_2$ diluted with water to about 5% to 50% solution by weight.

3. The method according to claim 2 wherein the average particle size of the colloidal silica is about 10 nm to 100 nm and wherein the polish is adjusted to a pH at 20° C. of 9.5 to 11 with mild alkalies.

4. The method according to claim 2 wherein the surface of the polished piezoelectric material is etched in an approximate 1:50:150 solution of $HCl:HF:H_2O$ at about 70° C.

5. The method according to claim 3 wherein the surface of the polished piezoelectric material is etched in an approximate 1:50:150 solution of $HCl:HF:H_2O$ at about 70° C.

* * * * *